United States Patent
Bolger et al.

(10) Patent No.: US 11,285,950 B1
(45) Date of Patent: Mar. 29, 2022

(54) VEHICLE ONE PEDAL DRIVE GRADE COMPENSATION SYSTEM

(71) Applicant: Ford Global Technologies, LLC, Dearborn, MI (US)

(72) Inventors: Bryan Michael Bolger, Canton, MI (US); Sergey Gennadievich Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 17/034,997

(22) Filed: Sep. 28, 2020

(51) Int. Cl.
  *B60W 30/18* (2012.01)
  *B60W 10/10* (2012.01)
  *B60W 10/18* (2012.01)
  *B60W 40/08* (2012.01)
  *B60W 50/02* (2012.01)
  *B60W 50/08* (2020.01)

(52) U.S. Cl.
  CPC ...... *B60W 30/18118* (2013.01); *B60W 10/10* (2013.01); *B60W 10/18* (2013.01); *B60W 40/08* (2013.01); *B60W 50/0205* (2013.01); *B60W 50/087* (2013.01); *B60W 2420/00* (2013.01); *B60W 2510/184* (2013.01); *B60W 2510/244* (2013.01); *B60W 2520/00* (2013.01); *B60W 2552/15* (2020.02)

(58) Field of Classification Search
  CPC ...... B60W 10/04; B60W 10/08; B60W 10/10; B60W 10/18; B60W 30/18118; B60W 40/08; B60W 50/0205; B60W 50/0225; B60W 50/087; B60W 2552/15; B60W 2420/00; B60W 2510/184; B60W 2510/244; B60W 2520/00
  See application file for complete search history.

(56) References Cited

U.S. PATENT DOCUMENTS

| | | | |
|---|---|---|---|
| 9,238,412 B2 | 1/2016 | Kidston et al. | |
| 10,259,341 B2 * | 4/2019 | Lor | B60L 15/20 |
| 2009/0048755 A1 * | 2/2009 | Tokimasa | B60K 31/00 701/94 |
| 2010/0332096 A1 * | 12/2010 | Hanzawa | B60K 31/047 701/70 |
| 2016/0090006 A1 * | 3/2016 | Yamazaki | B60W 10/08 701/22 |

(Continued)

FOREIGN PATENT DOCUMENTS

KR 101618453 B1 5/2016

*Primary Examiner* — Edwin A Young
(74) *Attorney, Agent, or Firm* — David B Kelley; Brooks Kushman P.C.

(57) ABSTRACT

A vehicle includes a gear selector that selects between a drive and reverse gear. The gear selected defines an intended travel direction. The vehicle also includes a controller that, responsive to user input, activates a one-pedal drive system, and responsive to detecting the vehicle is rolling back for more than a predefined time period, a feedforward road grade compensation torque being opposite to the intended travel direction and having a magnitude greater than a feedforward threshold, and a feedback data noise compensation torque in the intended travel direction having a magnitude greater than a feedback threshold, reduces the maximum magnitude of the feedforward road grade compensation torque to a predefined value throughout a current key cycle for the vehicle.

19 Claims, 2 Drawing Sheets

(56) References Cited

U.S. PATENT DOCUMENTS

2016/0096446 A1\* 4/2016 Yamazaki ............ B60W 20/00
                                                    477/20
2016/0264020 A1   9/2016 Ochocinski et al.
2019/0263400 A1\* 8/2019 Chunodkar ..... B60W 30/18136

\* cited by examiner

VEHICLE ONE PEDAL DRIVE GRADE COMPENSATION SYSTEM

TECHNICAL FIELD

The present disclosure relates to hybrid/electric vehicles and one-pedal drive systems for hybrid/electric vehicles.

BACKGROUND

Hybrid/electric vehicles may include one-pedal drive systems that are configured to brake the vehicle through regenerative braking in response to releasing the accelerator pedal and without application of the brake pedal.

SUMMARY

A vehicle includes a gear selector configured to select between a drive and reverse gear. The gear selected defines a travel direction. The vehicle also includes a controller configured to responsive to user input, activate a one-pedal drive system, and responsive to detecting the vehicle is rolling back for more than a predefined time period, a feedforward road grade compensation torque being opposite to the travel direction having a magnitude greater than a feedforward threshold, and a feedback data noise compensation torque in the travel direction having a magnitude greater than a feedback threshold, reduce the maximum magnitude of the feedforward road grade compensation torque to a predefined value throughout a current key cycle for the vehicle.

A method for controlling a one-pedal drive system of a vehicle includes responsive to user input, selecting a gear defining a travel direction of the vehicle. The method further includes, responsive to detecting a fault in the system, reducing a maximum magnitude of feedforward torque that compensates for road grade to a predefined value. The fault is defined by the vehicle moving in a direction opposite to the travel direction, the feedforward torque being opposite to the travel direction, and feedback torque that compensates data noise being in the travel direction and having a magnitude greater than a feedback threshold.

A one-pedal drive system for a vehicle includes a gear selector configured to select between a drive and reverse gear. The gear selected defines a travel direction of the vehicle. The one-pedal drive system also includes a controller configured to, responsive to detecting the vehicle moving in a direction opposite to the travel direction, a feedforward road grade compensation torque being opposite to the travel direction and having a magnitude greater than a feedforward threshold, and a feedback data noise compensation torque being in the travel direction and having a magnitude greater than a feedback threshold, reduce a maximum magnitude of the feedforward road grade compensation torque to a predefined value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
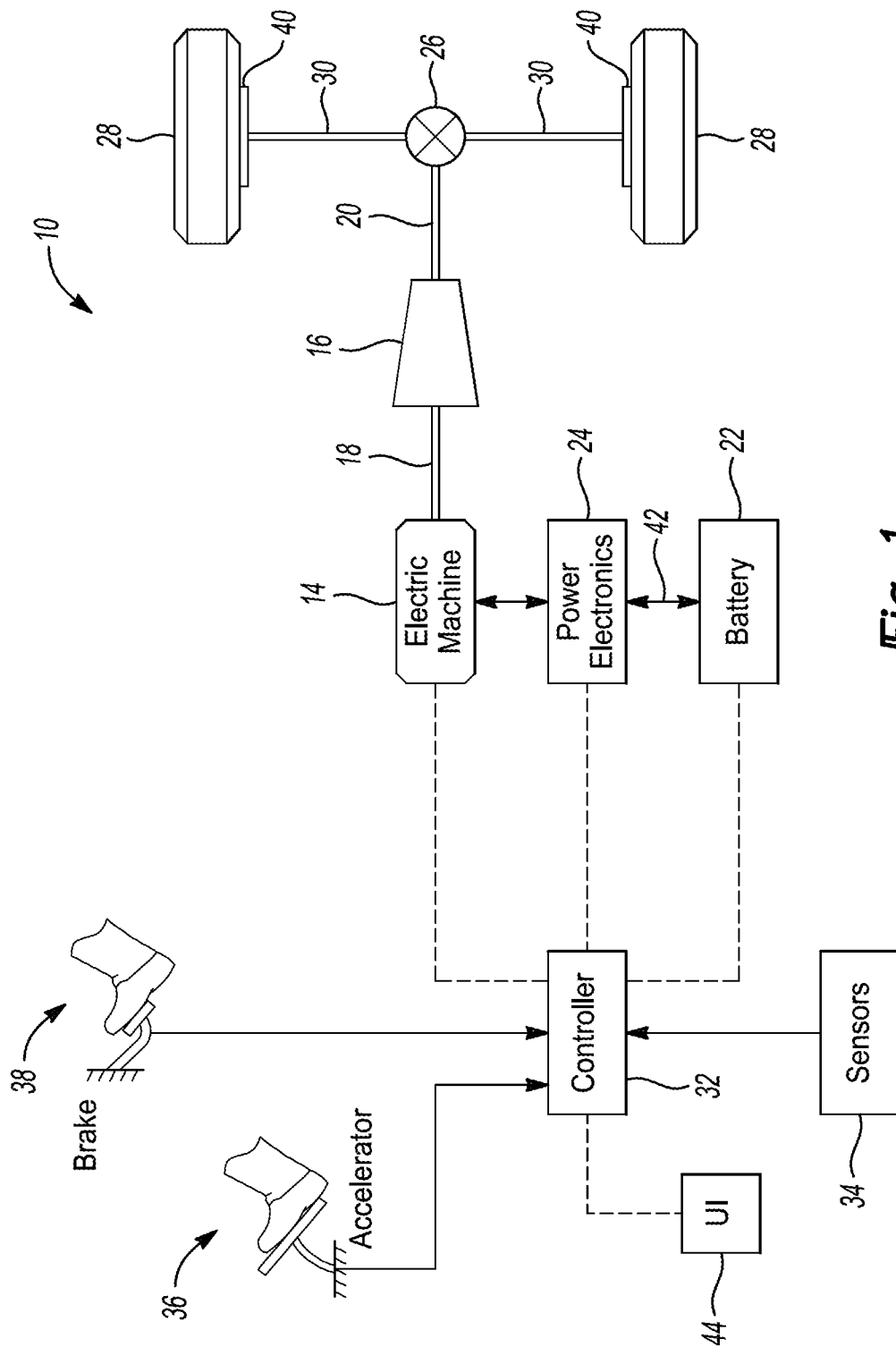
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 may include a powertrain 12. The powertrain 12 may include an electric machine 14 (e.g. an electric motor/generator) that drives a transmission (or gearbox) 16. More specifically, the electric machine 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the electric machine 14 and the transmission 16. Alternatively, the transmission 16 may be a multiple step-ratio automatic transmission. An associated traction battery 22 may be configured to deliver electrical power to or receive electrical power from the electric machine 14.

The electric machine 14 may be a drive source for the electric vehicle 10 that is configured to propel the electric vehicle 10. The electric machine 14 may be implemented by various types of electric machines. For example, the electric machine 14 may be a permanent magnet synchronous motor. Power electronics 24 may condition direct current (DC) power provided by the traction battery 22 to the requirements of the electric machine 14, as will be described below. For example, the power electronics 24 may provide three phase alternating current (AC) to the electric machine 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements may be controllable through a shift schedule that connects and disconnects certain elements of the gear sets to control the ratio between the transmission output shaft 20 and the transmission input shaft 18. The transmission 16 may be automatically shifted from one ratio to another based on various vehicle and ambient operating conditions by an associated controller, such as a powertrain control unit (PCU) (not shown). Power and torque from the electric machine 14 may be delivered to and received by transmission 16. The transmission 16 then may provide powertrain output power and torque to the output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., the electric machine 14) and then provides torque to an output shaft (e.g., the output shaft 20) at the different ratios is acceptable for use with embodiments of the present disclosure. For example, the transmission 16 may be implemented by a continuously variable transmission (CVT) operated by one or more belts and pulleys. Alternatively, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 may be connected to a differential 26. The differential 26 may drive a pair of drive wheels 28 via respective axles 30 connected to the differential 26. The differential 26 may transmit approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The electric machine 14 may be configured to deliver power to the wheels 28 to drive the vehicle 10 via the various connections described above. It should be understood that the connections between the electric machine 14 and the wheels 28 described herein are for illustrative purposes only and that other drivetrain configurations between the electric machine 14 and the wheels 28 may be implemented in the alternative.

The powertrain 12 may further include an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the electric machine 14 to provide wheel torque or charge the battery 22, select or schedule transmission shifts, etc.

The controller 32 may include a microprocessor/processor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The powertrain 12 may further include or connect to vehicle sensors 34 configured to provide sensor data to the controller 32. As a few non-limiting examples, the sensors 34 may include one or more wheel speed sensors configured to provide the controller 32 (e.g. an anti-lock brake controller) with rotation speed data of the one or more wheels 28.

The controller 32 may communicate with various vehicle sensors 34 and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 32 may communicate signals to and/or receive signals from the electric machine 14, traction battery 22, transmission 16, power electronics 24, sensors 34, and any another component of the powertrain 12 that may be included, but is not shown in FIG. 1 (e.g., a launch clutch that may be disposed between the electric machine 14 and the transmission 16.) Although not explicitly illustrated, those of ordinary skill in the art will recognize various functions or components that may be controlled by the controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, electric machine operation, clutch pressures for the transmission gearbox 16 or any other clutch that is part of the powertrain 12, and the like. As introduced above, the sensors 34 communicating input through the I/O interface may be used to indicate wheel speeds, vehicle speed, vehicle weight, coolant temperature, accelerator pedal position, ignition switch position, ambient air temperature (e.g., ambient air temperature sensor), transmission gear, ratio, or mode, transmission oil temperature, transmission input and output speed, deceleration or shift mode, battery temperature, voltage, current, or state of charge (SOC) for example.

Control logic or functions performed by the controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as the controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 36 may be used by the driver of the vehicle 10 to provide a demanded torque, power, or drive command to the powertrain 12 (or more specifically the electric machine 14) to propel the vehicle 10. In general, depressing and releasing the accelerator pedal 36 generates an accelerator pedal position signal that may be interpreted by the controller 32 as a demand for increased power or decreased power, respectively. Stated in other terms, increasing an amount of depression of the accelerator pedal may be configured to generate a command to increase the speed of the vehicle 10 while decreasing an amount of depression of the accelerator pedal may be configured to generate a command to decrease the speed of the vehicle 10. A brake pedal 38 may be also used by the driver of the vehicle to provide a demanded braking torque to slow or decrease the speed of the vehicle. In general, depressing the brake pedal 38 may generate a brake pedal position signal that may be interpreted by the controller 32 as a demand to decrease the vehicle speed. Based upon inputs from the accelerator pedal 36 and brake pedal 38, the controller 32 may command the torque and/or power to the electric machine 14, and friction brakes 40. The friction brakes 40 may be configured to apply torque to the wheels in response to depression of the brake pedal 38 in order to slow or brake the vehicle 10. The controller 32 also controls the timing of gear shifts within the transmission 16.

The electric machine 14 may operate as a motor to provide a driving force for the powertrain 12. To drive or propel the vehicle with the electric machine 14 the traction battery 22 may transmit stored electrical energy through wiring 42 to the power electronics 24 that may include an inverter, for example. The power electronics 24 may then convert DC voltage from the battery 22 into AC voltage to be used by the electric machine 14. The controller 32 may command the power electronics 24 to convert the DC voltage from the battery 22 to the AC voltage provided to the electric machine 14 to provide positive or negative torque to the input shaft 18.

The electric machine 14 may also operate as a generator and convert kinetic energy from the powertrain 12 into electric energy to be stored in the traction battery 22. More specifically, the electric machine 14 may operate as a generator during times of regenerative braking in which torque and rotational (or kinetic) energy from the spinning wheels 28 is transferred back through the transmission 16 and is converted into electrical energy for storage in the traction battery 22. Regenerative braking may also result in slowing or braking the vehicle.

It should be understood that the schematic illustrated in FIG. 1 is merely representative and is not intended to be limiting. Other configurations may be contemplated without deviating from the scope of the disclosure. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine (not shown) such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), vehicle weight, etc.

The vehicle 10 may include a one-pedal drive (1PD) mode. In the one-pedal drive mode, the speed of the vehicle 10 may be increased in response to increasing a depressed position of the accelerator pedal 36 while releasing the accelerator pedal 36 may result in breaking the vehicle 10 via regenerative braking through the electric machine 14. More specifically, the vehicle 10 may be slowed or braked via releasing the accelerator pedal 36 alone without an application or depression of the brake pedal 38. If the vehicle 10 has come to a stopped position where the vehicle speed is zero, it may be desirable to ensure that the vehicle 10 remains at zero speed in the event the vehicle operator has not applied the brake pedal 38 in one-pedal drive mode once the vehicle has obtained zero speed.

The vehicle 10 may include a user interface 44, such as control panel, touch screen, push button, etc. that is in communication with the controller 32. The controller 32 may be configured to enable and disable the one-pedal driving mode based on an operator selected input from the user interface 44.

Here, a method and system are proposed for the vehicle 10 to smoothly stop (i.e. reaching zero speed) in the one-pedal drive mode by taking into account a feedforward (FF) signal reflecting a road grade and a feedback (FB) signal reflecting noise factors. The present disclosure further proposes a mode for the one-pedal drive system when a fault is detected based on the feedforward and feedback signals. The feedforward and feedback signals may be in the form of torques calculated and processed by the controller 32 based on sensor data received from the one or more sensors 34. For instance, the feedforward signal indicative of a road grade may be estimated by the controller 32 using vehicle longitudinal acceleration compensation for gravity from an ABS module based on measurement of rotation speed and/or acceleration of each vehicle wheel 28. Alternatively, the road grade feedforward torque may be calculated by the controller 32 using data received from a gyroscope sensor 34 (if provided) or the like. Alternatively, the road grade may be obtained by the controller 32 via navigation controls configured to determine a vehicle location using satellite signals corresponding to digital map data reflecting the road grade recorded in a local storage of the vehicle 10. In general, the feedforward torque should be substantially zero when the vehicle travels on flat ground (i.e. no grade). The accelerator pedal map torque may be calibrated so that, on flat ground, the vehicle 10 would come to a complete stop with the driver's foot off any pedal. On a grade, the feedforward torque is non-zero and calculated such that the vehicle 10 would respond to the accelerator pedal the same way as when the vehicle 102 is on flat ground. The feedback torque should be close to zero assuming that the road surface quality and other noise factors that affect the correlation between the wheel torque and the vehicle speed are small.

When the vehicle 10 travels downhill (i.e. negative grade), a negative feedforward torque may be generated by the controller 32 and applied to the vehicle wheels 28 to compensate a positive acceleration caused by the gravity of the vehicle 10 on the negative road grade. When the vehicle 10 travels uphill (i.e. positive grade), a positive feedforward torque may be generated by the controller 32 and applied to the vehicle wheels 28 to compensate a negative acceleration caused by the gravity of the vehicle 10 on the positive grade. The magnitude of the feedforward torque may increase as the absolute value of the grade increases, and decrease as the absolute value of the grade reduces.

The feedback torque may be generated by the controller 32 to further compensate the longitudinal acceleration of the vehicle 10 by considering noise and conditions of various kind. For instance, the feedback torque may be affected by the weight/load of the vehicle 10 such that a heavier vehicle weight may cause a greater magnitude on the feedback torque. The feedback torque may be further affected by a brake drag on one or more of the friction brakes 40. The feedback torque may be further affected by any error on one or more vehicle sensors 34 providing data to the controller 32 to determine the actual longitudinal motion condition of the vehicle 10. As an example, the controller 32 may measure an actual speed of the vehicle at a given time using the one or more speed sensors 34. The actual speed of the vehicle 10 may be measured via one or more of the vehicle wheels 28. Additionally or alternatively, the actual speed of the vehicle 10 may be determined by measuring a rotational speed of the electric machine 14, which is coupled to the wheels 28 through the transmission 16 at a given gear ratio known to the controller 32. In either case, the actual speed may then be compared with a projected speed using a predetermined speed profile indicative of projected longitudinal motion characteristics at a given road grade reflected in the feedforward signal. In an ideal situation, the actual speed should substantially match the projected speed indicating no or little error is present in the system. However, a noise may be detected if there is a significant difference between the actual and projected speed. The controller 32 may calculate the feedback torque as a function of the noise/error determined based on the speed difference and apply the feedback torque to the wheels 28 in addition to the feedforward torque.

As discussed above, the feedforward torque may be calculated based on the longitudinal vehicle acceleration signal received from the sensors 34 and any error in the acceleration signal may affect the one-pedal drive vehicle stopping. A small error/noise may be corrected by the feedback torque. However, a significant error in the feedforward torque may not be overcome by the feedback torque. The controller 32 may be further provided with a mode responsive to detecting a fault in the one-pedal drive system.

Figure 2:
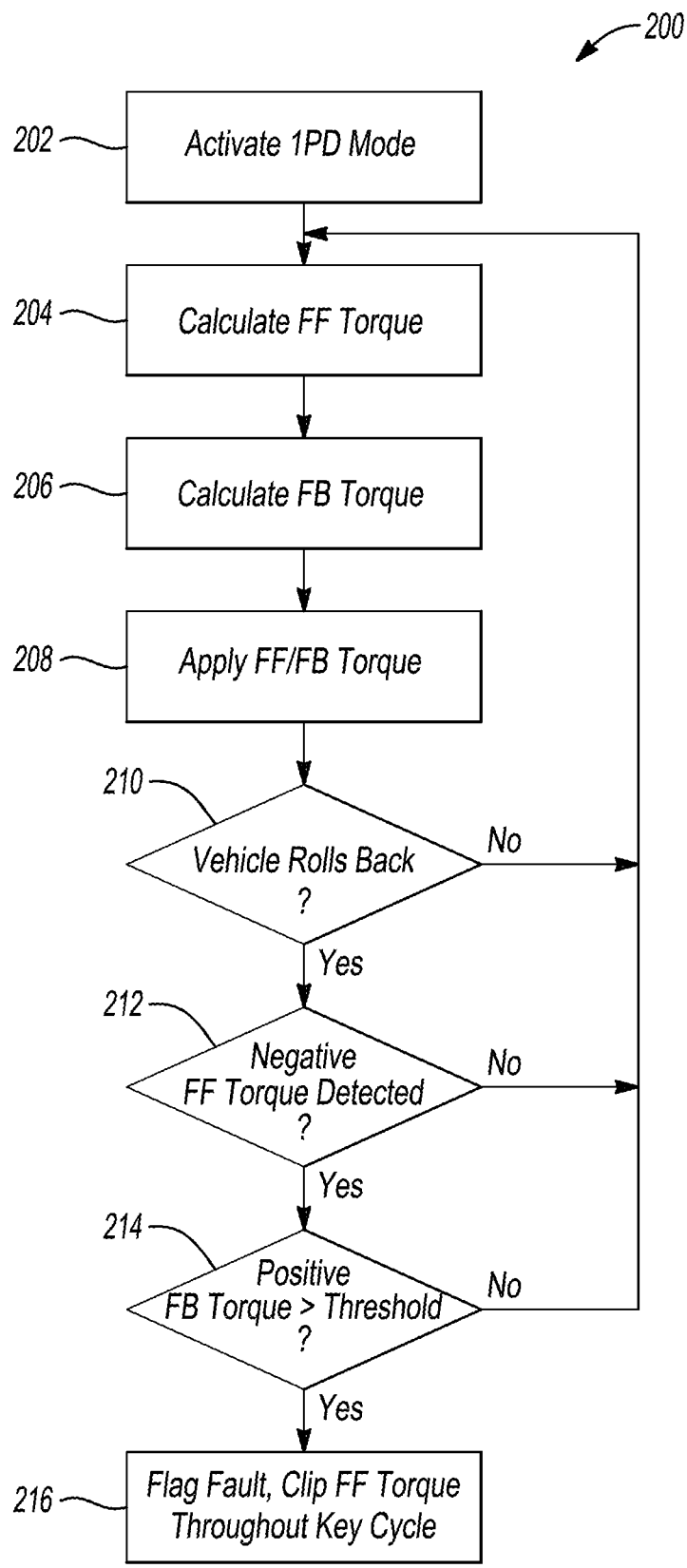
FIG. 2 is a flow diagram of a one pedal drive control process of an electric vehicle.

Referring to FIG. 2, a flow diagram for a one-pedal drive control process 200 is illustrated. With continuing reference to FIG. 1, at operation 202, the controller 32 activates the one-pedal drive mode responsive to a user input via the user interface 44 for instance. Responsive to the one-pedal drive mode, the controller 32 calculates the feedforward torque using sensor data reflecting a road grade at operation 204, and calculates the feedback torque using sensor data reflecting data noise at operation 206 as discussed above. The controller 32 applies the feedforward and feedback torque to the vehicle wheels 28 through the electric machine 14 at operation 208. The controller 32 may determine a total torque adjustment value by summing the feedforward and feedback torque to provide to the electric machine 14. To detect any fault in the system, at operation 210, the controller 32 verifies if the vehicle is rolling back in a direction opposite to the intended travel direction identified by the gear selection. For instance, if drive/forward gear is selected, the vehicle rollback may be defined as a backward motion. On the contrary, if the reverse/backward gear is selected, the vehicle rollback may be defined as a forward motion. Additionally, a speed threshold may be used by the controller 302 to prevent false alarm. As an example, the controller 32 may only determine a vehicle rollback responsive to the vehicle speed exceeding an absolute value of 0.5 km/h. If the answer is a no indicating the system is operating normally, the process returns to operation 204. Otherwise, the process proceeds to operation 212 to make further determinations.

At operation 212, the controller 32 verifies if a negative feedforward torque is generated. The negative feedforward torque may be defined as a torque applied to the vehicle opposite to the intended travel direction identified by the gear selection. For instance, a torque urging the vehicle to travel backward is negative when the drive gear is selected, whereas a torque urging the vehicle to travel forward is negative when the reverse gear is selected. Additionally, the controller 32 may further compare the magnitude of the feedforward torque with a feedforward threshold (e.g. 50 Nm) and only determines the present value of the negative feedforward torque responsive to the magnitude of the torque exceeding the threshold. If that is the case, the process proceeds to operation 214 and the controller 32 further determines if a positive feedback torque is present and exceeds a feedback threshold (e.g. 300 Nm). The positive feedback torque may be defined as a torque applied to the vehicle in the intended direction identified by the gear selection. For instance, a torque urging the vehicle to travel forward is positive when the drive gear is selected, whereas a torque urging the vehicle to travel backward is positive when the reverse gear is selected.

It should be noted that the feedforward and feedback threshold values introduced herein are merely exemplary values for illustrative purposes. The thresholds may be predetermined based on the characteristics of the vehicle 10 (e.g. vehicle curb weight, output power and regen power specification or the like). Alternatively, the feedforward and feedback thresholds may be adjustable by the controller 32 based on various factors. For instance, the feedback threshold may be adjusted to be proportional to the absolute value of the road grade. In other words, a higher feedback threshold may be used responsive to a steeper road. The feedback threshold may be further adjusted as a function of the vehicle speed such as a higher value may be used when the vehicle speed is high, and a lower value may be used when the vehicle slows down. The feedback threshold may be further adjusted as function of the SOC of the traction battery 22 such that a higher value may be used when the battery SOC is high. The feedback threshold may be further adjusted based on the temperature of the friction brakes 40. The controller 32 may increase the feedback threshold when the friction brakes are at an operating temperature (e.g. 100-200° C.) and reduce the feedback threshold when the temperature of the friction brakes is lower or higher than the operating temperature. In general, the magnitude of the feedforward threshold is set significantly lower than that of the feedback temperature. For instance, the feedforward threshold may be set and adjusted within one sixth (i.e. ⅙) of the feedback threshold.

If the answer for operation 214 is a yes, a fault is detected in the one-pedal drive system and the process proceeds to operation 216. Additionally, a timer may be used throughout the detection stage from operations 210 to 214 to prevent false alarm. For instance, the controller 32 may only determine the presence of the fault when the conditions detected at operations 210 to 214 persist longer than a time threshold (e.g. 100 ms). At operation 216, the controller 32 flags a fault condition and clips the feedforward torque throughout the current key cycle. The controller 32 may clip the feedforward torque by imposing a maximum absolute value to the magnitude of the torque. Alternatively, the controller 32 may only clip the negative feedforward torque while keeping the positive torque unclipped.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a gear selector configured to select between a drive and reverse gear, wherein the gear selected defines an intended travel direction; and
   a controller configured to responsive to user input, activate a one-pedal drive system, and responsive to detecting the vehicle is rolling back for more than a predefined time period, a feedforward road grade compensation torque being opposite to the intended travel direction and having a magnitude greater than a feedforward threshold, and a feedback data noise compensation torque in the intended travel direction having a magnitude greater than a feedback threshold, reduce the maximum magnitude of the feedforward road grade compensation torque to a predefined value throughout a current key cycle for the vehicle.

2. The vehicle of claim 1, wherein the controller is further configured to compare an actual speed of the vehicle measured by a speed sensor with a projected speed based on a predetermined speed profile to determine a speed difference, and calculate the feedback data noise compensation torque based on the speed difference.

3. The vehicle of claim 1, wherein the controller is further configured to calculate the feedforward road grade compensation torque using data received from an anti-lock brake controller.

4. The vehicle of claim 1, wherein the controller is further configured to adjust the feedback threshold based on road grade such that the feedback threshold increases responsive to steeper road grade.

5. The vehicle of claim 1, wherein the controller is further configured to adjust the feedback threshold based on a vehicle speed measured by a speed sensor such that the feedback threshold increases responsive to a higher vehicle speed.

6. The vehicle of claim 1, wherein the controller is further configured to adjust the feedback threshold based on a state of charge (SOC) of a vehicle battery such that the feedback threshold increases responsive to a higher battery SOC.

7. The vehicle of claim 1, wherein the controller is further configured to adjust the feedback threshold based on a friction brake temperature such that the feedback threshold increases responsive to the friction brake temperature being within a predefined range.

8. The vehicle of claim 1, wherein the magnitude of the feedforward threshold is less than the magnitude of the feedback threshold.

9. The vehicle of claim 8, wherein the controller is further configured to adjust the feedforward threshold in a predefined proportion to the feedback threshold.

10. A method for controlling a one-pedal drive system of a vehicle, comprising:
    responsive to user input, selecting a gear defining an intended travel direction of the vehicle; and
    responsive to detecting a fault in the system, reducing a maximum magnitude of feedforward torque that compensates for road grade to a predefined value, wherein the fault is defined by:
        the vehicle moving in a direction opposite to the intended travel direction,
        the feedforward torque being opposite to the intended travel direction, and
        feedback torque that compensates data noise being in the intended travel direction and having a magnitude greater than a feedback threshold.

11. The method of claim 10, wherein the fault further includes the feedforward torque having a magnitude greater than a feedforward threshold.

12. The method of claim 11, wherein the magnitude of the feedforward threshold is less than the magnitude of the feedback threshold, the method further comprising adjusting the feedforward threshold in a predefined proportion to the feedback threshold.

13. The method of claim 10, wherein the fault is further triggered responsive to each of the conditions persisting longer than a predefined time period.

14. The method of claim 10, further comprising adjusting the feedback threshold based on the road grade such that the feedback threshold increases responsive to a steeper road grade.

15. The method of claim 10, further comprising adjusting the feedback threshold based on a vehicle speed measured by a speed sensor such that the feedback threshold increases responsive to a higher vehicle speed.

16. The method of claim 10, further comprising adjusting the feedback threshold based on a state of charge (SOC) of a vehicle battery such that that the feedback threshold increases responsive to a higher battery SOC.

17. A one-pedal drive system for a vehicle, comprising:
    a gear selector configured to select between a drive and reverse gear, wherein the gear selected defines an intended travel direction of the vehicle; and
    a controller configured to, responsive to detecting the vehicle moving in a direction opposite to the intended travel direction, a feedforward road grade compensation torque being opposite to the intended travel direction and having a magnitude greater than a feedforward threshold, and a feedback data noise compensation torque being in the intended travel direction and having a magnitude greater than a feedback threshold, reduce a maximum magnitude of the feedforward road grade compensation torque to a predefined value.

18. The one-pedal drive system of claim 17, wherein the controller is further configured to calculate the feedforward road grade compensation torque using data received from a gyroscope sensor.

19. The one-pedal drive system of claim 17, wherein the controller is further configured to compare an actual speed of the vehicle measured by a speed sensor with a projected speed based on a predetermined speed profile to determine a speed difference, and calculate the feedback data noise compensation torque based on the speed difference.

* * * * *